United States Patent

Nelson et al.

[15] 3,635,428
[45] Jan. 18, 1972

[54] AUTOMATIC PILOT FOR NAVIGABLE CRAFT

[72] Inventors: Raymond A. Nelson; William F. Poland, both of Phoenix, Ariz.

[73] Assignee: Sperry Rand Corporation

[22] Filed: Jan. 17, 1969

[21] Appl. No.: 791,887

[52] U.S. Cl. ............................................. 244/77, 343/107
[51] Int. Cl. .......................................................... B64c 13/50
[58] Field of Search .................... 244/77 B, 77 C, 77 S, 77 E; 343/107

[56] References Cited

UNITED STATES PATENTS

| 3,041,607 | 6/1962 | Rhodes et al. | 244/77 X |
| 3,098,228 | 7/1963 | Medlinski et al. | 244/77 X |
| 3,099,007 | 7/1963 | Kittrell | 244/77 X |
| 3,361,391 | 1/1968 | Medlinski et al. | 244/77 |
| 3,399,850 | 9/1968 | Kramer et al. | 244/77 |

Primary Examiner—Milton Buchler
Assistant Examiner—James E. Pittenger
Attorney—S. C. Yeaton

[57] ABSTRACT

An automatic pilot for navigable craft in which the drift angle of the craft derived from an inertial navigation system is used to cancel the course heading error in the presence of wind to provide the beam damping function required to achieve asymptotic capture and tight on-course control without overshoot or stand off in the presence of crosswind and/or wind shear.

10 Claims, 4 Drawing Figures

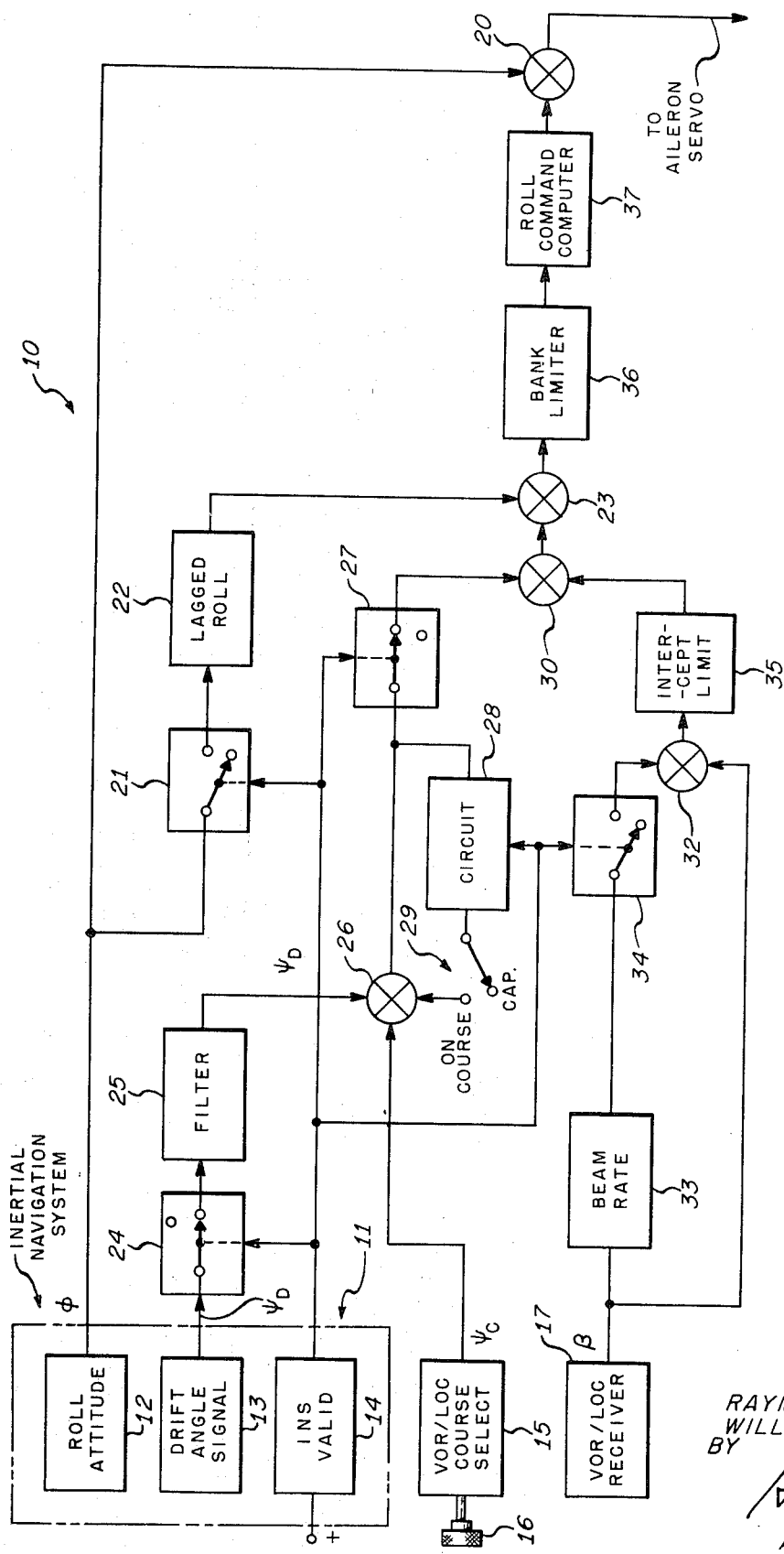

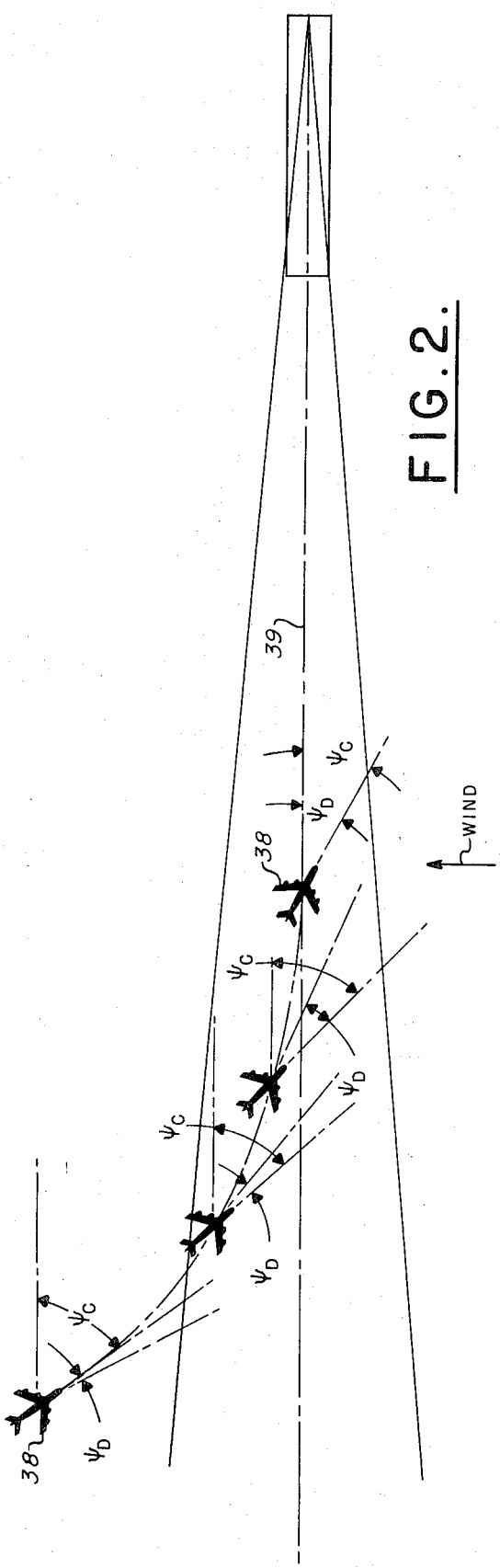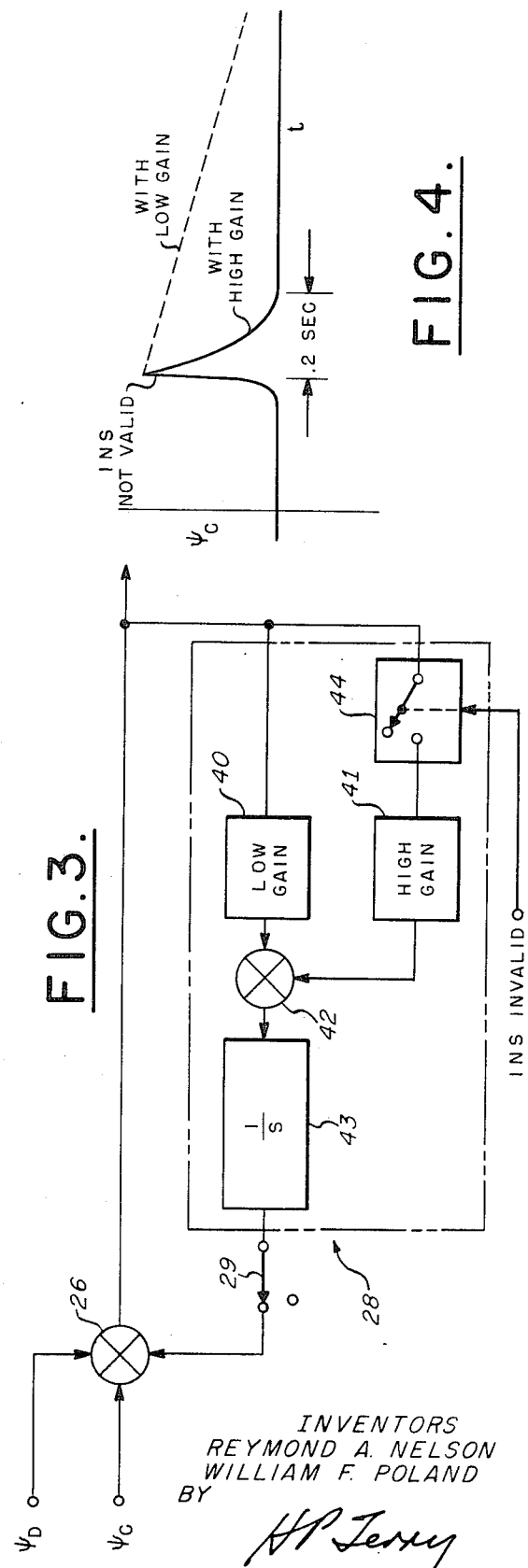

AUTOMATIC PILOT FOR NAVIGABLE CRAFT

BACKGROUND OF THE INVENTION

1. Field of the Invention

The invention pertains to navigation systems and more particularly to systems by means of which a craft may be controlled to capture and maintain a defined course or path, for example, a radio-defined VOR course or ILS leading beam.

2. Description of the Prior Art

Prior art automatic pilots particularly those suitable for aircraft generally utilize a flight path integrator to cancel the heading course error in the presence of crosswinds where course error is derived from a heading reference system. When making an approach, utilizing the beam integral results in overshoot or hang-off since it requires a finite amount of time to build up the integral signal from the beam error signal. The time required results in overshooting the radio-defined course. Further, once the aircraft has captured the beam, crosswind gusts tend to blow the aircraft off the radio-defined course because it again takes time for integration of the beam error to provide an effective integral signal which then controls the craft to return to the beam.

Prior art automatic pilots also utilize signals representative of the beam rate which are obtained by differentiating the beam displacement signal from the radio receiver. Beam rate signals obtained in this manner are inherently noisy in an electrical sense and do not provide the desired heading stabilization.

Prior art systems also suffer from undesirable transients should a portion of the system be suddenly rendered ineffective. When the aircraft is close to the ground, these transients may result in a dangerous condition.

SUMMARY OF THE INVENTION

The present invention provides a radio beam approach damping function representative of the difference between the course heading error derived from a heading reference and the substantially instantaneous drift angle continuously derived, for example, from an inertial navigation system to provide asymptotic and substantially dead beat capture of the radio-defined ground track as well as unusually accurate and tight on-course control in the presence of both steady crosswinds and wind shear conditions. Wind shear may be defined as a variable velocity wind strata as the aircraft changes altitude and is frequently encountered during an approach. Utilizing a beam-damping function obtained in this manner continuously during both the beam approach and on-course modes references the damping term to the aircraft heading required to fly a desired beam heading rather than the course select heading. This results in improved capture and on-course performance. It also eliminates the need for a path integrator to cancel heading course errors in the presence of crosswinds thereby eliminating the problems associated with using beam integral and beam differential signals as explained above. Further, it improves the dynamic performance during gust and wind shear conditions by allowing the aircraft to weathercock.

The present invention also includes means for compensating for undesirable transients should a portion of the system be suddenly rendered ineffective as well as conversion to another mode of operation.

BRIEF DESCRIPTION OF THE DRAWINGS

FIG. 1 is an electrical schematic diagram in block form of the present invention as applied to an automatic pilot for aircraft;

FIG. 2 is a diagram illustrating a typical localizer approach utilizing the present invention;

FIG. 3 is an electrical schematic diagram in block form showing a detailed version of the washout circuit of FIG. 1; and FIG. 4 is a signal diagram showing the effect of the washout circuit of FIG. 3.

DESCRIPTION OF THE PREFERRED EMBODIMENT

The present invention will be explained with respect to an automatic pilot for aircraft being utilized to make an approach to a runway defined by a localizer radio beam, for purposes of example. In systems of this type, signals representative of the displacement, rate of change of displacement and acceleration of the aircraft with respect to the radio-defined path are provided for enabling the craft to be flown asmptotically towards the radio beam when controlled in accordance with the algebraic summation of the aforementioned signals. The automatic pilot functions as a computer to compute the dynamic equation of craft motion and employs the displacement, rate and acceleration signals as instantaneous values of the terms of the equation to provide an output for controlling the craft in terms of control surface motion or flight director indications whereby the pilot is cognizant of the correction necessary to navigate correctly to approach asmptotically and thereafter maintain the desired flight path as defined by the radio beam.

The present invention utilizes the drift angle of the aircraft to cancel the course heading error in the presence of crosswind or wind shear conditions to provide the beam damping or rate term in the equation $\beta + (\psi_C - \psi_D) + \phi = 0$ where $\beta$ is the beam displacement error, $\psi_C$ is the course error, $\psi_D$ is the drift angle and $\phi$ is the bank angle. The use of the drift angle to cancel the course heading error references the damping term obtained thereby to the aircraft heading required to fly a desired beam heading rather than to the course select heading which results in the advantages explained above.

Referring now to FIG. 1, an automatic pilot 10 is disclosed having an inertial navigation system (INS) 11 for continuously supplying a substantially instantaneous measure of craft drift angle, i.e., the difference between the instantaneous heading of the craft and the direction of the craft's ground track. The gyro platform of the inertial navigation system 11 also provides a roll attitude signal 100 representative of the roll angle of the aircraft from a roll attitude signal generating device 12 associated therewith. The device 12 may alternatively comprise a vertical gyro, for example. The INS 11 further includes the drift angle signal generating apparatus 13 for providing a signal $\psi_D$ representative of the above-defined drift angle of the aircraft in the presence of crosswind or wind shear conditions. The INS 11 also includes an INS valid signal-generating apparatus 14 which is responsive to a positive source of potential to provide a positive valid signal when the INS 11 is $\phi$properly and an invalid signal of zero potential when the INS 11 is not operating properly, i.e., is not valid.

A course select apparatus 15, such as provided in a conventional horizontal situation indicator, is manually adjustable in a conventional manner by means of a knob 16 to provide a signal representative of the difference between the actual magnetic heading of the craft and the magnetic heading of the radio course. This signal is referred to as the course error $\psi_C$. A navigation receiver 17 capable of receiving VOR or ILS localizer signals provides a signal $\beta$ representative of the horizontal or lateral displacement of the aircraft from the radio-defined flight path. The roll signal $\phi$ from the roll attitude apparatus 12 is connected to an input terminal of an algebraic summation device 20 which has its output connected to the aileron servo as indicated by the legend and may also be connected to provide a flight director indication which is not shown for purposes of simplicity.

The roll angle signal $\phi$ is also connected to a switch 21. The output of the switch 21 is connected through a lag roll circuit 22 which in turn is connected to an input terminal of an algebraic summation device 23. The drift angle signal $\psi$ from the output of the drift angle apparatus 13 is connected to a switch 24 which has its output connected to a filter circuit 25 and thence to an input terminal of an algebraic summation device 26. The course error signal $\psi_C$ from the course select apparatus 15 is connected to another input terminal of the algebraic summation device 26. The output of the algebraic summation device 26 is connected to a switch 27 and a lag or washout circuit 28. The output of the circuit 28 is connected to a switch 29 that has its output connected to another input terminal of the algebraic summation device 26 in feedback fashion. The output of the switch 27 is connected to an input terminal of an algebraic summation device 30.

The receiver 17 provides the beam displacement signal $\beta$ directly to one input terminal of an algebraic summation device 32 and via a beam rate circuit 33 and a switch 34 to the other input terminal of the summation device 32. The output of the summation device 32 is connected through an intercept limit circuit 35 to another input terminal of the summation device 30 which has its output connected to the summation device 23. The output of the summation device 23 is connected via a bank limiter circuit 36 and a roll command computer 37 to the other input terminal of the summation device 20.

To provide for proper switching functions, the output of the INS valid circuit 14 is connected to control the switches 21, 24, 27 and 34 and the lag circuit 28. As shown in FIG. 1, with an INS valid signal, the switches 21 and 34 are normally open whereas the switches 24 and 27 are normally closed. With an INS invalid signal or valid signal, the switches are in the opposite condition as that shown and explained above.

In operation, it is assumed that the INS 11 is operating normally whereby a positive INS valid signal is provided, thus the switches 24 and 27 are closed with switches 21 and 34 open. Also, the switch 29 is open. The pilot selects the beam course heading by rotating the knob 16 and the craft is maneuvered, either manually or automatically to establish the desired intercept angle to the radio-defined beam. If in the automatic pilot mode, this angle is established by intercept limiter 35. As the aircraft reaches the edge of the beam. As shown in FIG. 2, the capture mode is established and the beam displacement signal $\beta$ from the receiver 17 is transmitted through the summation device 32 and the intercept limit circuit 35. The instantaneous drift angle signal $\psi_D$ from the inertial navigation system is passed through switch 24 and filtered in the filter 25 while the course error signal $\psi_C$ is provided from the course select apparatus 15. The drift angle signal $\psi_D$ and the course error signal $\psi_C$ are subtracted in the algebraic summation device 26 and the difference therebetween is connected through switch 27 to summation device 30 where it is algebraically summed with the limited beam displacement signal $\beta$ from the limiter 35. Since, during this capture mode the intercept angle is referenced to ground track rather than magnetic heading, the capture is greatly improved in the presence of crosswinds. The summed signal is then passed through summation device 23 and limited in the bank limiter 36 if in excess of a predetermined bank angle command threshold and connected via the roll command computer 37 to be summed with the roll angle signal $\phi$ in the summation device 20. Thus, the aileron servo is controlled in accordance with the terms of the approach coupler equation $\beta+(\psi_C-\psi_D)+\phi\phi_C$, i.e., equals the commanded surface deflection.

Referring to FIG. 2, which shows, for example, an easterly LOC course with a southerly wind the course-heading selected by the pilot would be 90°. At a predetermined value of beam error, i.e., the capture point, the drift angle $\psi_D$ as determined and instantaneously supplied by the INS, has a low value which increases as the aircraft 38 turns to approach the center of the radio beam and is a maximum under the assumed wind direction when the aircraft 38 is on-course and flying on the radio beam track 39. When the aircraft 38 is coupled to the desired course as defined by the radio beam, the inertially derived drift angle $\psi_D$ is equal to the difference between the course heading selected (090) and the actual aircraft heading.

By subtracting the drift angle $\psi_D$ from the course error $\psi_C$, the heading damping term used during the radio beam control mode is instantaneously and continuously referenced to a wind-corrected course heading. In other words, during the capture mode, the intercept angle is referenced to the actual ground track rather than to magnetic heading thereby resulting in improved capture performance in the presence of crosswind or wind shear. Similarly, in the on-course mode, the aircraft is flying at a ground-track-derived heading. If a change in crosswind occurs, the resulting change in drift angle $\psi_D$ instantaneously available from the INS, commands an aircraft heading to maintain the beam track. Since the drift angle signal $\psi_D$ is derived rapidly from the INS, it cancels the heading damping term $\psi_C$, on a dynamic basis and the aircraft is free to weather cock into the wind and to obtain the wind corrected heading very rapidly. In effect, the drift angle $\psi_D$ functions as a beam rate term.

Referring again to FIG. 1, when the on-course mode is established, the switch 29 is closed connecting the output of the lag or integral circuit 28 to the input terminal of the summation device 26 thereby slowly washing out the algebraic summation of the course error $\psi_C$ and drift angle $\psi_D$ applied to the other input terminals of the summation device 26. This washout provision eliminates any steady state errors between the INS drift angle $\psi_D$ and the course heading error $\psi_C$ when the aircraft is coupled to the beam.

As shown in FIG. 1, the lag circuit 28 is also used to provide a washout of course error $\psi_C$ when the INS drift angle $\psi_D$ information is not valid. When the aircraft is coupled to the beam in the on-course mode in normal operation, the INS drift angle $\psi_D$ cancels the course error $\psi_C$ resulting from a crosswind. If the INS 11 fails, an INS invalid signal is applied to open the switch 24 thereby removing the drift angle signal $\psi_D$, and at the same time closes switches 21 and 34 to thereby supply the lagged roll ($\int\phi\approx\psi$) signal and beam rate signal as the beam damping term.

Another feature of the present invention is the means by which the system is converted to this alternative mode without introducing transients. Referring now to FIGS. 1 and 3, the lag circuit 28 shown in FIG. 1 is shown in greater detail in FIG. 3 and includes a low- and high-gain configuration represented by the circuits 40 and 41, respectively. The low-gain configuration of the feedback path includes the low-gain circuit 40, summation device 42, lag circuit 43 and switch 29 while the alternate high-gain feedback configuration includes a switch 44, high-gain circuit 41, summation device 42, lag circuit 43 and switch 29. Since the course error signal $\psi_C$ is partially cancelled by the drift angle $\psi_D$ during the capture phase and is completely cancelled thereby during the on-course phase under crosswind conditions, if the INS 11 fails, a large course error signal $\psi_C$ is present which would produce a correspondingly large yaw step input when $\psi_D$ is removed by switch 24. To prevent transients when the drift angle signal $\psi_D$ is removed thereby providing a step function course error signal $\psi_C$, the washout circuit 28 is switched into a high-gain configuration by closing the switch 44 by means of an INS invalid signal. By greatly increasing the gain of the feedback washout circuit via high-gain circuit 41, the step function signal $\psi_C$ is rapidly washed out by momentarily increasing the gain, for example, for 0.2 seconds or less. This results in converting the step signal to a spike signal as shown in FIG. 4 having a very short duration. The roll command computer 37 is arranged to have a time constant, for example, of approximately 1 second and thus the resulting spike signal is rendered ineffective by the roll command computer 37 due to its long-time constant and hence does not reach the aircraft control surface. The washout circuit 28 compensates for the difference between the course select heading and the aircraft heading in the presence of crosswind.

Referring again to FIG. 1, it will be noted when the INS 11 is not valid, the drift angle signal $\psi_D$ is rendered ineffective. During this time the autopilot 10 reverts to a configuration with the switches 21 and 34 closed thereby providing lagged roll signals from the circuit 22 and beam rate signals from the circuit 33 to provide the damping function.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. In an automatic pilot for navigable craft adapted for path guidance,
   means for providing a first damping signal representative of the angular difference between the actual craft heading and a desired course,
   means for providing a second damping signal continuously representative of the instantaneous value of the drift angle of said craft, and
   means responsive to said first and second damping signals for providing a composite damping signal in accordance with the difference therebetween.

2. In an automatic pilot for navigable craft of the character recited in claim 1, further including
   means for providing a signal representative of the displacement of said craft from said desired course,
   means for providing a signal representative of the acceleration of said craft towards said desired course, and
   means responsive to said displacement, composite damping and acceleration signals for providing an output signal in accordance with the algebraic summation thereof.

3. In an automatic pilot for navigable craft of the character recited in claim 1 in which said path is a radio-defined path, receiver means for providing a signal representative of the displacement of said craft from a radio-defined course, means for providing a signal representative of the acceleration of said craft towards said radio-defined course, and means responsive to said displacement, composite damping and acceleration signals for controlling said craft in accordance with the algebraic summation thereof.

4. In an automatic pilot for navigable craft of the character recited in claim 1 in which said path comprises a radio defined beam, said means for providing a second damping signal being continuously effective during approaching, capturing and tracking said beam.

5. In an automatic pilot for navigable craft of the character recited in claim 1 in which said means for providing a second damping signal comprises inertial navigation means for continuously providing said instantaneous drift angle signal.

6. In an automatic pilot for navigable craft of the character recited in claim 1 in which said craft is an aircraft and said desired course is a radio-defined, receiver means for providing a signal representative of the displacement of said aircraft from said radio-defined course, means for providing a roll attitude signal representative of the acceleration of said aircraft toward said radio-defined course, in which said means for providing a first damping signal includes course select means for providing a first damping signal representative of the angular difference between the actual craft heading and said radio-defined course, and means responsive to said displacement, composite damping and acceleration signals for controlling said aircraft in accordance with the algebraic summation thereof.

7. In an automatic pilot for navigable craft of the character recited in claim 6, further including
   means including washout circuit means responsive to said composite damping signal rendered effective when said craft is on-course for eliminating steady state errors between said first and second damping signals.

8. In an automatic pilot for navigable craft of the character recited in claim 7, further including
   means including gain changing means responsive to said composite damping signal for rendering said first damping signal momentarily ineffective when said second damping signal is invalid thereby preventing transients.

9. In an automatic pilot for navigable craft of the character recited in claim 6 further including
   beam rate circuit means responsive to said displacement signal for providing a beam-damping signal,
   lagged roll circuit means responsive to said roll attitude signal for providing a heading damping signal,
   and switching means responsive to the validity of said second damping signal for rendering said beam rate and roll rate signals effective in lieu of said composite damping signal when said second damping signal is invalid.

10. A navigational system for aircraft adapted for controlling the aircraft to approach and thereafter maintain a desired radio defined ground track, the combination comprising,
    means providing a first signal representative of the displacement of said aircraft from said ground track,
    means for providing a second signal representative of the rate of approach of aircraft to said ground track,
    means connected to receive said first and second signals for supplying an aircraft control command signal corresponding to the algebraic sum thereof,
    said means for supplying said second signal comprising
    mean for supplying a heading error signal representative of the difference between the magnetic heading of the aircraft relative to the magnetic bearing of said radio-defined ground track,
    means for supplying a further signal continuously representative of the substantially instantaneous value of the direction of the actual ground track of the aircraft relative to the magnetic heading of the aircraft, and
    means for algebraically combining said heading error signal and said further signal to provide said second signal.

* * * * *